United States Patent Office.

THOMAS C. SCOTTRON AND SIDNEY PLUMMER, OF SPRINGFIELD, MASS.

IMPROVEMENT IN COMPOSITION FOR BLACKING STOVES, &c.

Specification forming part of Letters Patent No. 106,877, dated August 30, 1870.

*To all whom it may concern:*

Be it known that we, THOMAS C. SCOTTRON and SIDNEY PLUMMER, both of Springfield, in the county of Hampden and State of Massachusetts, have invented a new and useful Compound for Blacking Stoves and other Hardware; and we do hereby declare that the following is a full, clear, and exact description thereof.

Our invention relates to a compound for blacking and polishing stoves and stove-hardware; and it consists of a proper admixture of common plumbago or black lead with asphaltum, spirits of turpentine, and sometimes, according to the circumstances of its use, with naphtha, forming a compound which may be applied to stoves and stove-hardware, for the purpose of polishing the same without the attendance of dirt or dust, which results in the use of blacking now in common use.

That others skilled in the art may be able to make and use our invention, we will now proceed to describe the same.

We first dissolve any convenient quantity of asphaltum in a sufficient quantity of spirits of turpentine to form a varnish of about the consistency of what is known in commerce as "black varnish." We then mix the lead and varnish together until they are thoroughly incorporated, using about as much lead as the varnish would take up, forming a thick paste, so that it may be lifted upon a stick. We then add naphtha until the compound is made sufficiently thin to be applied easily with a brush.

The naphtha tends to give a quick drying property to the compound, and when it is to be used by a female, or a person unused to blacking, we add a little spirits of turpentine, which is used to prevent the compound from drying too fast; otherwise, when applied to any extent of surface, the compound would dry after its application to the iron faster than an inexperienced or weak person could polish the surface; but when used by a man, the spirits of turpentine may be omitted, as a strong person could polish the surface as fast as the naphtha would cause it to dry. Hence, for use in large manufactories, only sufficient turpentine may be introduced to dissolve the asphaltum, the compound being made sufficiently thin for application by the admixture of naphtha, while for domestic purposes the compound may be made sufficiently thin by the addition of turpentine, naphtha being also used to give the compound sufficient penetration to produce an even polish upon the surface of the iron.

The naphtha also prevents the polish from being washed off or injured by exposure to the weather or dampness, and the polish on a stove or piece of hardware will last very much longer when blacked with this compound, and will actually resist the action of the weather.

When stoves are shipped from the manufactories, it is customary to coat them with grease to prevent their being injured by exposure to the weather, and when they reach their destination the grease is taken off, and the stoves are blacked and polished.

Our invention entirely obviates any necessity for this application of grease, as the stoves may be blacked and polished before shipment, and may then be safely shipped without any danger from dampness or weather.

Having thus described our invention, what we claim as new, and desire to secure by Letters Patent, is—

The improved compound, composed of the ingredients herein described, substantially as and for the purposes specified.

THOMAS C. SCOTTRON.
SIDNEY PLUMMER.

Witnesses:
T. A. CURTIS,
T. L. BOYNTON.